(12) United States Patent
Stahl

(10) Patent No.: US 12,427,857 B2
(45) Date of Patent: Sep. 30, 2025

(54) MOTOR VEHICLE

(71) Applicant: Bayerische Motoren Werke Aktiengesellschaft, Munich (DE)

(72) Inventor: Hans-Ulrich Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 757 days.

(21) Appl. No.: 17/775,487

(22) PCT Filed: Oct. 6, 2020

(86) PCT No.: PCT/EP2020/077945
§ 371 (c)(1),
(2) Date: May 9, 2022

(87) PCT Pub. No.: WO2021/089262
PCT Pub. Date: May 14, 2021

(65) Prior Publication Data
US 2022/0396142 A1  Dec. 15, 2022

(30) Foreign Application Priority Data
Nov. 7, 2019  (DE) ............ 10 2019 130 030.4

(51) Int. Cl.
*B60K 15/067* (2006.01)
*B60K 15/03* (2006.01)
*B60K 15/063* (2006.01)

(52) U.S. Cl.
CPC .. *B60K 15/067* (2013.01); *B60K 2015/03309* (2013.01); *B60K 2015/0634* (2013.01)

(58) Field of Classification Search
CPC .............................................. B60K 2015/0634
See application file for complete search history.

(56) References Cited

U.S. PATENT DOCUMENTS

| 2,314,298 A * | 3/1943 | Welch ................. B60K 15/063 |
| | | 280/833 |
| 9,033,085 B1 | 5/2015 | Rawlinson |
| 10,525,824 B2 * | 1/2020 | Kataoka ................ F17C 13/084 |
| 10,850,611 B2 * | 12/2020 | Buchholz ......... B60K 15/03006 |
| 11,549,642 B2 * | 1/2023 | Albl ......................... F17C 1/00 |
| 2009/0014221 A1 | 1/2009 | Kim et al. |
| 2018/0029465 A1 | 2/2018 | Abd Elhamid et al. |
| 2018/0208052 A1 | 7/2018 | Heidenreich et al. |

(Continued)

FOREIGN PATENT DOCUMENTS

| CN | 107850267 A | 3/2018 |
| DE | 10 2007 054 357 A1 | 1/2009 |

(Continued)

OTHER PUBLICATIONS

International Search Report (PCT/ISA/210) issued in PCT Application No. PCT/EP2020/077945 dated Jan. 27, 2021 with English translation (four (4) pages).

(Continued)

*Primary Examiner* — Kevin Hurley
*Assistant Examiner* — Hosam Shabara
(74) *Attorney, Agent, or Firm* — Crowell & Moring LLP

(57) ABSTRACT

A motor vehicle has a pressure vessel unit, the pressure vessels of which are arranged on both sides of a recess or depression in a passenger compartment floor.

14 Claims, 5 Drawing Sheets

(56) References Cited

U.S. PATENT DOCUMENTS

| | | | | |
|---|---|---|---|---|
| 2018/0283610 A1* | 10/2018 | Wexler | ............... | F17C 1/16 |
| 2019/0047409 A1 | 2/2019 | Kataoka et al. | | |
| 2020/0231034 A1 | 7/2020 | Buchholz et al. | | |
| 2021/0164615 A1 | 6/2021 | Albl et al. | | |
| 2023/0053395 A1* | 2/2023 | Graci | ............... | F17C 13/084 |

FOREIGN PATENT DOCUMENTS

| | | |
|---|---|---|
| DE | 10 2011 012 496 A1 | 8/2012 |
| DE | 10 2013 014 958 A1 | 3/2015 |
| DE | 10 2014 221 167 A1 | 4/2016 |
| DE | 10 2017 117 151 A1 | 2/2018 |
| DE | 10 2018 205 967 A1 | 10/2018 |
| EP | 2 508 381 A2 | 10/2012 |
| WO | WO 2019/038198 A1 | 2/2019 |

OTHER PUBLICATIONS

German-language Written Opinion (PCT/ISA/237) issued in PCT Application No. PCT/EP2020/077945 dated Jan. 27, 2021 (six (6) pages).

German-language Search Report issued in German Application No. 10 2019 130 030.4 dated Aug. 31, 2020 with partial English translation (eleven (11) pages).

Chinese-language Office Action issued in Chinese Application No. 202080074555.4 dated Dec. 20, 2024 with English translation (17 pages).

* cited by examiner

MOTOR VEHICLE

BACKGROUND AND SUMMARY

The technology disclosed herein relates to a motor vehicle.

Motor vehicles can be configured, for example, for being operated with gaseous fuel. In order to store the fuel, a pressure vessel arrangement can be configured in the motor vehicle. This pressure vessel arrangement can be arranged, for example, below a passenger compartment. It has been shown, however, that traveling comfort can be impaired for passengers as a result.

It is one preferred object of the technology disclosed herein to reduce or to eliminate at least one disadvantage of a previously known solution or to propose an alternative solution. In particular, it is one preferred object of the technology disclosed herein to configure a motor vehicle in such a way that traveling comfort is increased. Further preferred objects can result from the advantageous effects of the technology disclosed herein. The object or objects is/are achieved by way of the subject matter of the independent claim. The dependent claims are preferred refinements.

The technology disclosed herein relates to a motor vehicle.

The motor vehicle comprises a vehicle body, in which a passenger compartment is configured. In this passenger compartment, in particular, occupants and/or luggage can be transported. The passenger compartment is delimited on the bottom side by a passenger compartment floor.

The motor vehicle has a pressure vessel arrangement with a plurality of pressure vessels.

A recess is configured in the passenger compartment floor.

Pressure vessel longitudinal axes are expediently oriented parallel to a longitudinal direction of the recess. At least one pressure vessel is arranged below the passenger compartment floor on a first side of the recess, and at least one pressure vessel is arranged below the passenger compartment floor on a second side of the recess. The first side and the second side lie opposite one another on both sides of the recess. The pressure vessels are expediently connected to one another rigidly by way of at least one first connector and one second connector. This makes it possible for the entire pressure vessel arrangement with the connectors to be understood as one vessel. Corresponding approval tests can thus be performed on the entire pressure vessel arrangement including the connectors, and it is sufficient for a common valve to be used for the pressure vessel arrangement with the connectors.

The recess expediently penetrates into an intermediate space which is configured between the pressure vessels which are arranged on the first side of the recess and the pressure vessels which are arranged on the second side of the recess.

In the case of a motor vehicle of this type, a recess can be provided which penetrates into an installation space which would otherwise typically be filled by the pressure vessel arrangement. As a result, additional space can be obtained, in particular if the recess is accessible from above, that is to say expediently from the passenger compartment, and can provide, for example, a more comfortable footwell for passengers of a seating row, in particular a rear seating row.

The longitudinal direction of the recess can be, in particular, that direction, along which the recess has its greatest extent.

The passenger compartment floor can be, in particular, a constituent part of the vehicle body. It can also assume protective functions for the pressure vessels.

In each case one pressure vessel or else any desired number of pressure vessels can be arranged both on the first side and on the second side of the recess.

The sides can be seen, in particular, in a horizontal plane of the motor vehicle.

In accordance with one embodiment, the intermediate space can be configured between the connectors, but it can also be configured completely or partially above the connectors, for example.

A rigid connection can be understood to mean, in particular, that two or more pressure vessels which are connected by means of the one or more connectors cannot be moved with respect to one another on account of the direct action of the connector, at least not without active releasing of connections or destruction of components. In particular, a rigid connection which is brought about by way of the connectors is therefore differentiated from the effect of surrounding components such as, for example, a vehicle body or installation space.

The first connector is preferably fastened to at least three pressure vessels, all the pressure vessels, or all the pressure vessels of a layer of pressure vessels, in order to connect them to one another rigidly. The second connector is likewise preferably fastened to at least three pressure vessels, all the pressure vessels, or all the pressure vessels of a layer of pressure vessels, in order to connect them to one another rigidly. As a result, a connection can be achieved which goes beyond a possible fluidic connection which can be configured, for example, between two directly adjacent pressure vessels.

A layer of pressure vessels can comprise, for example, pressure vessels which are at an identical spacing from an undertray. A plurality of layers of pressure vessels can be configured, for example in order to utilize an existing installation space in an improved manner. For example, two or three layers, or else more than three layers, of pressure vessels might be present.

The first connector and/or the second connector can rigidly connect, in particular, at least one pressure vessel on the first side of the recess to at least one pressure vessel on the second side of the recess to one another. As a result, a rigid connection is configured across the recess, which rigid connection affords a particularly high stability.

The connectors can run below and/or outside the recess. They can also run laterally next to the recess.

The longitudinal axis of the recess can run transversely with respect to a motor vehicle longitudinal axis. This can be advantageous, for example, in the case of a vehicle configuration with seats which are oriented in the traveling direction and/or counter to the traveling direction.

The longitudinal axis of the recess can also run longitudinally with respect to the motor vehicle longitudinal axis. This can be advantageous, for example, in the case of seats which are oriented transversely with respect to the traveling direction.

Here, an orientation of a seat relates typically to that direction, in which a passenger seated thereon looks when his/her head is held straight.

The connectors can run, in particular, along the motor vehicle longitudinal axis. For example, they can run parallel to the motor vehicle longitudinal axis. Other orientations or non-rectilinear courses are also possible, however. In particular, they can also run transversely with respect to the motor vehicle longitudinal axis.

The motor vehicle longitudinal axis can be, in particular, that axis of the motor vehicle, along which the motor vehicle moves in the case of steered wheels which lie in the straight-ahead position. It is frequently but not necessarily the case that the motor vehicle has the greatest extent along this motor vehicle longitudinal axis.

The first connector and/or the second connector can connect, in particular, longitudinal ends of the pressure vessels. Here, for example, the first connector can connect longitudinal ends of the pressure vessels which are arranged on a first side of the motor vehicle, and the second connector can connect, for example, longitudinal ends of the pressure vessels which are arranged on a second side of the motor vehicle, which second side lies opposite the first side. This can be, for example, a left-hand side (as viewed in the forward traveling direction) and a right-hand side (as viewed in the forward traveling direction).

In particular, the first connector can be arranged to the left of the pressure vessels and the second connector can be arranged to the right of the pressure vessels, in relation to a forward traveling direction of the motor vehicle. As a result, the pressure vessels can be stabilized on both sides. Here, the forward traveling direction is typically that direction, in which the motor vehicle moves in the case of normal traveling. If the motor vehicle is designed in such a way that it can move in an equivalent manner in two opposite directions, each of these two directions can be considered to be a forward traveling direction. As an alternative, the first connector can be arranged in front of the pressure vessels and the second connector can be arranged behind the pressure vessels, in relation to the forward traveling direction of the motor vehicle. This arrangement can be advantageous, for example, in the case of seats which are oriented transversely with respect to the traveling direction.

The connectors can be configured, in particular, as rails. They can be configured, for example, in such a way that the pressure vessels can be fastened thereto and/or can be moved along the respective rail. A rail can extend, for example, along a respective longitudinal direction of the rail.

In particular, the pressure vessels can be displaceable along the rails before the configuration of a rigid connection. This can facilitate, for example, the installation and the positioning of the pressure vessels. After the displacement, the pressure vessels can be connected, for example rigidly, to the rails, for example by way of a screw connection. To this end, the rails can have, for example, a longitudinally continuous receptacle for the pressure vessels.

The connectors can cover, in particular, center points of end sides of the pressure vessels. As a result, a connection can be achieved at a height, at which a homogeneous distribution of force in the respective pressure vessel is possible. A center point can be, for example, a point, from which the pressure vessel has a constant radius in cross section. It can lie, for example, on a longitudinal axis or axis of symmetry of the pressure vessel.

The pressure vessel arrangement preferably has a pressure line. This pressure line can, in particular, connect the pressure vessels fluidically to a common connector. As a result, the pressure vessels can be filled jointly, and gas can be removed jointly, it preferably being possible here for the pressure vessels which lie on both sides of the recess to be connected together fluidically. Only one valve is thus advantageously necessary, in order to close all the pressure vessels.

The pressure line can, in particular, be connected separately to more than two pressure vessels or to all the pressure vessels. Therefore, a common connection for the connected pressure vessels and not only between two directly adjacent pressure vessels can be configured. As a result, more homogeneous filling and removal can be achieved.

The pressure line can run, in particular, in one of the connectors. As a result, the pressure line can be protected, for example, by way of the connector, in particular against mechanical damage. The common connector can preferably also be attached in a manner which is protected by way of the connector. Since the mechanical effect very frequently acts from the outside on the vehicle body in the case of accidents, an arrangement of the common connector between the first and second connector or between the first connector and the pressure vessels is therefore particularly suitable. Analogously, the one valve is ideally also attached in such a way that it is protected by way of the first and second connector.

The recess can, for example, configure a footwell for passengers in a preferred way.

In particular, a front seating row and a rear seating row can be arranged in the passenger compartment. Here, the recess can be situated, in particular, between the front seating row and the rear seating row. It can configure, in particular, a footwell for passengers of the rear seating row. Other configurations of seating rows can also be used, however, for example with three seating rows or with more seating rows. Here, for example, the recess can be situated between two of the seating rows. The front seating row does not necessarily have to be the frontmost seating row in the vehicle; it can also be a seating row which lies further toward the rear.

There can also be seating rows, for example, which extend along the motor vehicle longitudinal axis, with the result that passengers are typically seated transversely with respect to the traveling direction. The recess can be arranged, for example, between seating rows of this type.

There can also be a plurality of recesses, for example, which reach into a respective intermediate space which is delimited by respective pressure vessels which are arranged next to it and possibly by the connectors. The concept can be extended in this way, for example in the case of vehicles with more than two seating rows.

The pressure vessel arrangement serves, in particular, for the storage of gaseous fuel under ambient conditions. The pressure vessel arrangement can be used, for example, in a motor vehicle which is operated with compressed natural gas (CNG) or liquefied natural gas (LNG) or with hydrogen. The pressure vessel arrangement is expediently connected fluidically to at least one energy converter which is configured to convert the chemical energy of the fuel into other energy forms.

A pressure vessel can be, for example, a composite overwrapped pressure vessel (COPV). A pressure vessel can be, for example, a cryogenic pressure vessel (CcH2 or COP) or a high pressure gas vessel (CGH2).

High pressure gas vessels are configured to store fuel in the long term at ambient temperatures at a nominal working pressure (NWP) of approximately 350 bar overpressure (overpressure with respect to atmospheric pressure), further preferably of approximately 700 bar overpressure or more. A cryogenic pressure vessel is suitable for storing the fuel in the case of the abovementioned operating pressures even at temperatures which lie considerably below the operating temperature of the motor vehicle.

The pressure vessel arrangement can be configured, for example, as a tubular storage system. The latter can have a plurality of pressure vessels which in each case have a length/diameter ratio with a value between 5 and 40, preferably between 7 and 25, and particularly preferably between 9 and 15. The length/diameter ratio is the quotient of the length of the pressure vessel as the numerator and the external diameter of the pressure vessel as the denominator. The pressure vessels are expediently arranged parallel to one another and/or are connected fluidically to one another at their ends.

One specific embodiment consists in connecting the pressure vessels in series. As a result, they can expediently be produced in a continuous manufacturing process. The pressure vessel arrangement is then also called a chain tank. Fluid connecting elements can also be provided between the pressure vessels. A parallel circuit and/or combinations of a parallel circuit and a series circuit are also possible by way of fluid connecting elements between the pressure vessels.

Each pressure vessel can comprise, for example, a liner and/or a fiber-reinforced layer.

In other words, by way of an arrangement of the pressure vessels or tanks, for example, transversely with respect to the vehicle longitudinal axis, identical pressure vessels can be arranged in parallel and can effectively fill the underfloor space both in front of and behind a footwell recess. No pressure vessels are then typically situated merely in the region of the footwell recess. In order to prevent in each case one vessel valve having to then be used for the two underfloor regions (in front of and behind the footwell recess), a "common rail" can be provided as a stable connector which extends over the entire length of the underfloor installation space. The common rail is not interrupted by way of the footwell recess because it runs below the latter and/or laterally on the outside of the latter.

The technology disclosed herein will now be explained on the basis of the figures.

DETAILED DESCRIPTION OF THE DRAWINGS

Figure 1:
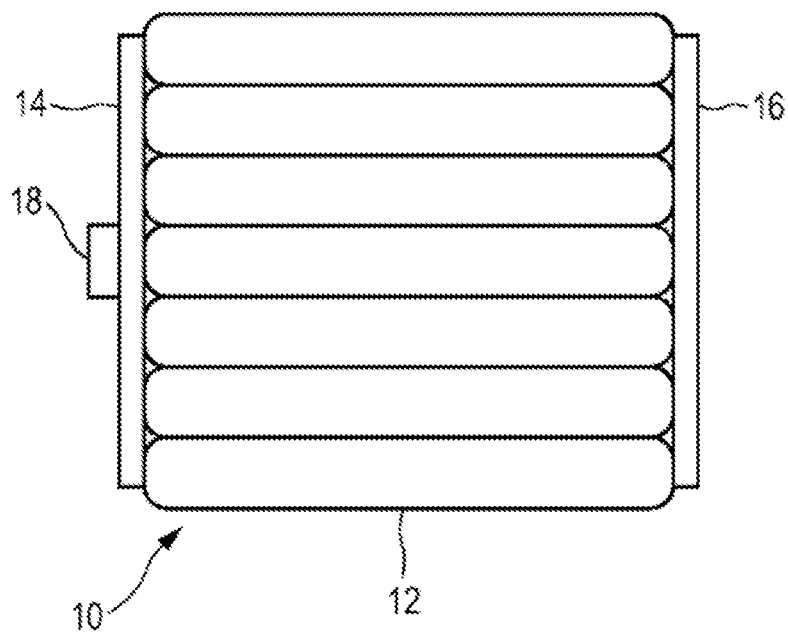
FIG. 1 shows a pressure vessel arrangement according to the prior art in a plan view.

FIG. 1 shows a pressure vessel arrangement 10 according to the prior art. Here, a plurality of (in the present case, seven) pressure vessels 12 are arranged parallel to one another, these pressure vessels adjoining one another directly.

A first connector 14 in the form of a rail is arranged on the left-hand side. A second connector 16 in the form of a rail is arranged on the right-hand side. The connectors 14, 16 connect the pressure vessels 12 to one another rigidly and therefore ensure that the pressure vessels 12 of the pressure vessel arrangement 10 form a stable unit.

In the present case, a pressure line is arranged in the first connector 14. This pressure line connects the pressure vessels 12 to a common connector 18. As a result, the pressure vessels 12 can be filled jointly with gas, and the gas can be removed correspondingly. In order to simplify the drawing, the common connector 18 is illustrated here outside the connector as an exception.

Figure 2:
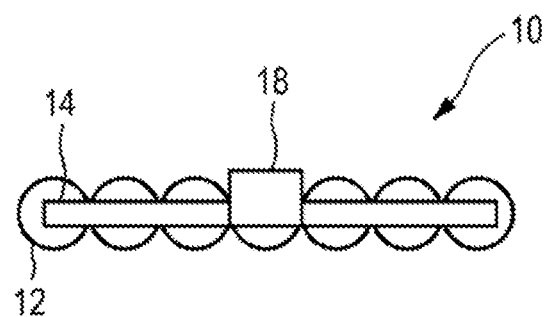
FIG. 2 shows the pressure vessel arrangement from FIG. 1 in a side view.

FIG. 2 shows the pressure vessel arrangement 10 from FIG. 1 in a side view.

As becomes clear from FIGS. 1 and 2, the pressure vessel arrangement 10 which is shown is a mat-shaped pressure vessel arrangement which does not leave any space for other components between the pressure vessels 12.

Figure 3:
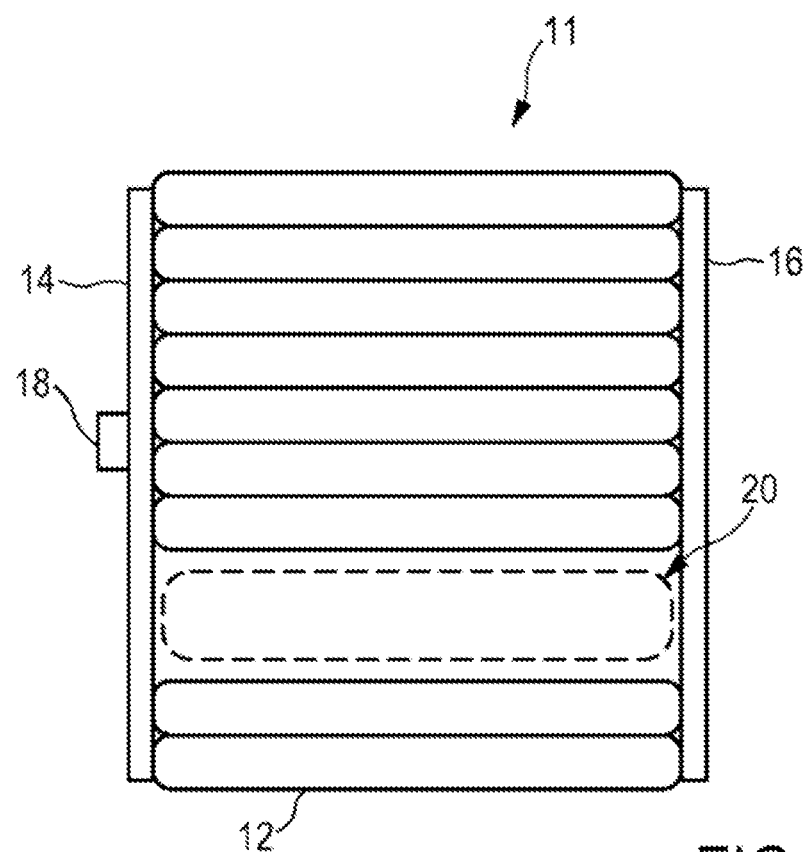
FIG. 3 shows a pressure vessel arrangement in a plan view.

FIG. 3 shows a pressure vessel arrangement 11, as can be used in a motor vehicle in accordance with one exemplary embodiment. Here, not all the pressure vessels 12 adjoin one another directly, but rather an intermediate space 20 is left, part of the pressure vessels 12 lying in front of the intermediate space 20 and part of the pressure vessels 12 lying behind the intermediate space 20. The intermediate space 20 is delimited laterally by the connectors 14, 16 which connect pressure vessels 12, arranged in front of and behind the intermediate space 20, to one another rigidly. It is assumed in the present case that a typical forward traveling direction of a motor vehicle, in which the pressure vessel arrangement 11 is installed, extends upward in the plane of the paper of FIG. 3.

Figure 4:
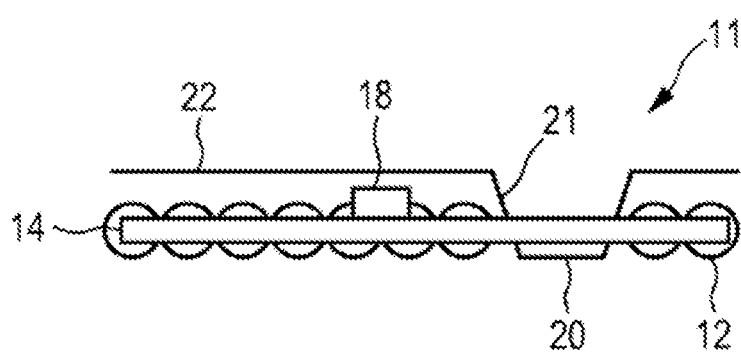
FIG. 4 shows the pressure vessel arrangement from FIG. 3 in a side view.

FIG. 4 shows the pressure vessel arrangement 11 in a side view in an indicated installed state. Here, the pressure vessel arrangement 11 is arranged below a passenger compartment floor 22 of an interior compartment of a motor vehicle. Here, part of the pressure vessels 12 are arranged in front of the intermediate space 20, and part of the pressure vessels 12 are arranged behind the intermediate space 20.

A recess 21 which reaches into the intermediate space 20 is configured in the passenger compartment floor 22. The recess 21 belongs to a passenger compartment which is arranged above it, with the result that it can be utilized from this passenger compartment.

In particular, the recess 21 can be used as a footwell for passengers or, for example, as storage space for cargo.

The pressure vessels 12 which are arranged in front of the intermediate space 20 are therefore arranged on a first side, and the pressure vessels 12 which are arranged behind the intermediate space 20 are therefore arranged on a second side of the recess 21. Pressure vessel longitudinal axes of the pressure vessels 12 are parallel to a longitudinal direction of the recess 21.

Figure 5:
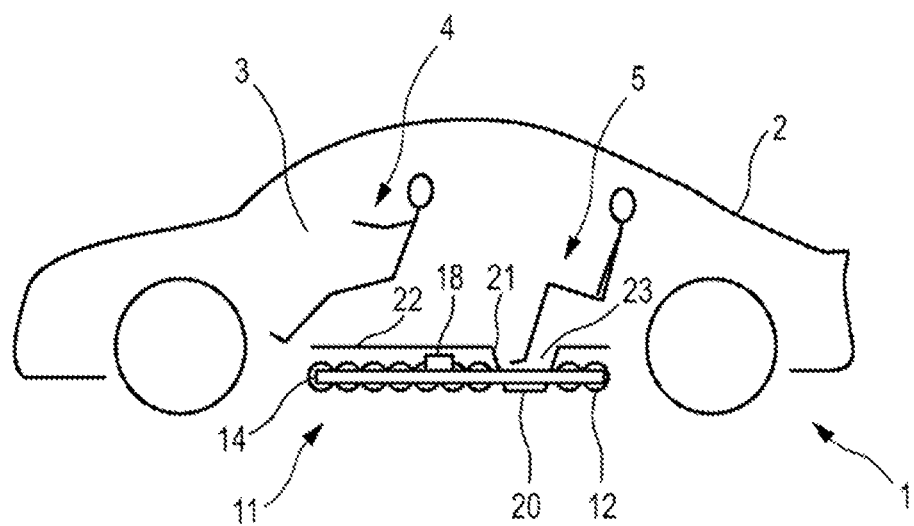
FIG. 5 shows a motor vehicle.

FIG. 5 purely schematically shows a motor vehicle 1. This motor vehicle 1 has a vehicle body 2. A passenger compartment 3 is configured in the vehicle body 2. A front seating row 4 and a rear seating row 5 are arranged in this passenger compartment 3.

A pressure vessel arrangement 11 in accordance with the embodiment of FIGS. 3 and 4 is arranged below the passenger compartment 3. Here, the recess 21 is arranged between the seating rows 4 and 5 and serves as a footwell 23 for passengers of the rear seating row 5.

The traveling comfort can be increased considerably by way of an embodiment of this type, and an underfloor arrangement of pressure vessels 12 can nevertheless be used. At the same time, the stability of the pressure vessel arrangement 11 is ensured by way of the connectors 14, 16, and the common connector 18 makes a simple fluidic connection to other components possible.

Figure 6:
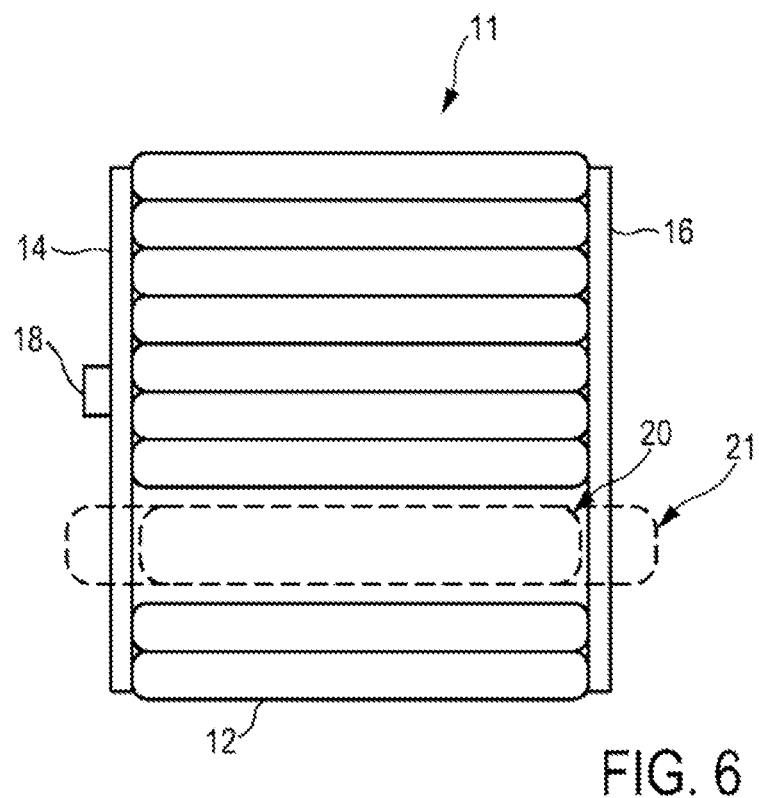
FIG. 6 shows an alternative pressure vessel arrangement in a plan view.
Figure 7:
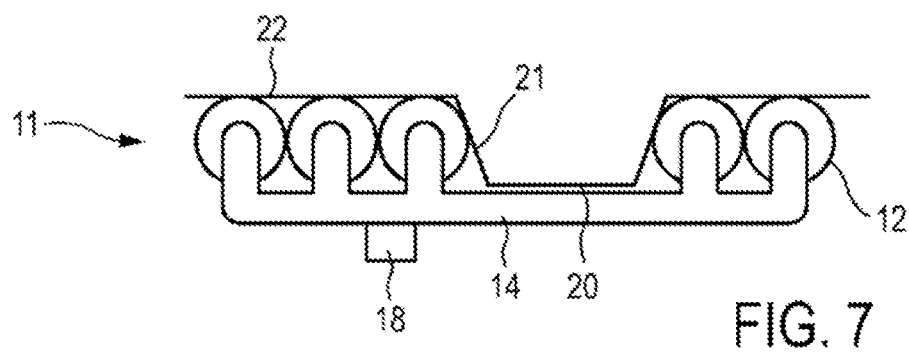
FIG. 7 shows the pressure vessel arrangement from FIG. 6 in a side view.

FIG. 6 shows an alternative embodiment of a pressure vessel arrangement 11, not only the intermediate space 20 but rather also an extent of the recess 21 being illustrated. Here, the recess 21 extends laterally beyond the connectors 14, 16. In the case of this embodiment, the connectors 14, 16 are arranged below the recess 21. This can also be seen in the associated side view of FIG. 7. As a result, the recess 21 can be extended laterally.

Figure 8:
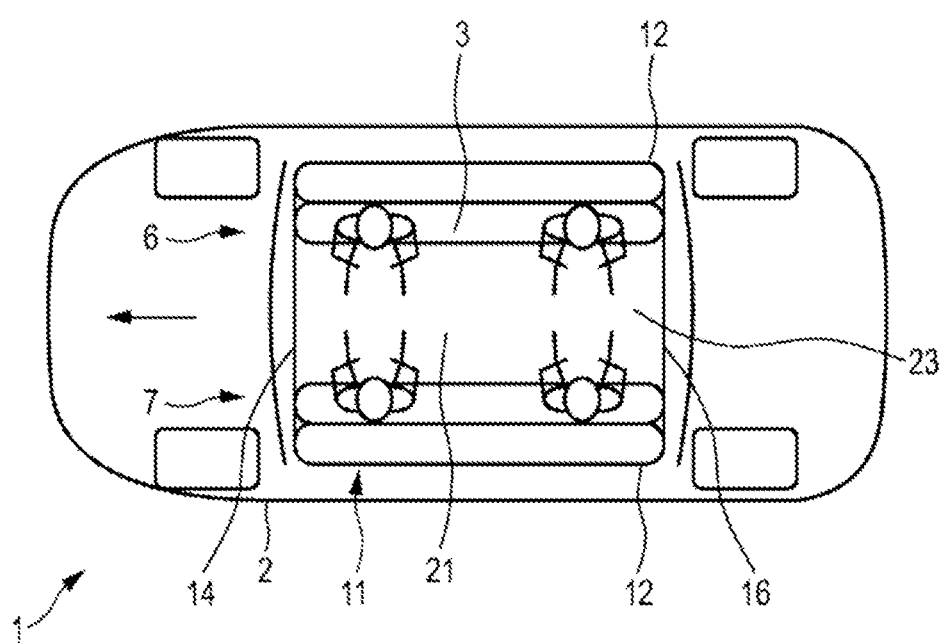
FIG. 8 shows an alternative motor vehicle.

FIG. 8 schematically shows an alternative motor vehicle 1 in a plan view. There are two longitudinally installed seating rows 6, 7 here, passengers sitting opposite one another and pointing transversely with respect to the traveling direction. A footwell 23 which is configured in the form of a recess 21 as has already been described is arranged between the seating rows 6, 7. Here, pressure vessels 12 are arranged to the left and to the right of the footwell 23.

For reasons of readability, the expression "at least one" has been partially omitted for simplification purposes. If a feature of the technology disclosed herein is described in the singular or using an indefinite article (for example, the/a pressure vessel, the/a connector), its plural is also intended to be disclosed at the same time (for example, the at least one pressure vessel, the at least one connector).

The preceding description of the present invention serves only for illustrative purposes and not for the purpose of the restriction of the invention. Within the context of the invention, various amendments and modifications are possible without departing from the scope of the invention and its equivalents.

It is to be noted that the pressure vessel arrangement disclosed herein can also be considered to be a self-contained aspect of the invention which is functionally independent of the motor vehicle. All of the variants which are disclosed herein can be used here.

LIST OF DESIGNATIONS

1 Motor vehicle
2 Vehicle body
3 Passenger compartment
4 Seating row
5 Seating row
6 Seating row
7 Seating row
10 Pressure vessel arrangement
11 Pressure vessel arrangement
12 Pressure vessel
14 Connector
16 Connector
18 Common connector
20 Intermediate space
21 Recess
22 Passenger compartment floor
23 Footwell

The invention claimed is:

1. A motor vehicle, comprising:
    a vehicle body, in which a passenger compartment is configured which is delimited on a bottom side by a passenger compartment floor;
    a pressure vessel arrangement with a plurality of pressure vessels;
    a recess configured in the passenger compartment floor;
    pressure vessel longitudinal axes oriented parallel to a longitudinal direction of the recess, wherein
    at least one pressure vessel is arranged below the passenger compartment floor on a first side of the recess, and at least one pressure vessel is arranged below the passenger compartment floor on a second side of the recess, and the first side and the second side are opposite one another on both sides of the recess,
    the pressure vessels are connected to one another rigidly by way of at least one first connector and one second connector,
    the recess penetrates into an intermediate space which is configured between the pressure vessels which are arranged on the first side of the recess and the pressure vessels which are arranged on the second side of the recess,
    the connectors are configured as rails, and
    the pressure vessel arrangement has a pressure line which connects the pressure vessels fluidically to a common connector and the pressure line runs in one of the rails.

2. The motor vehicle according to claim 1, wherein the first connector is fastened to at least three pressure vessels, all the pressure vessels, or all the pressure vessels of a layer of pressure vessels, in order to connect them to one another rigidly.

3. The motor vehicle according to claim 2, wherein the second connector is fastened to at least three pressure vessels, all the pressure vessels, or all the pressure vessels of a layer of pressure vessels, in order to connect them to one another rigidly.

4. The motor vehicle according to claim 1, wherein the first connector and/or the second connector connect at least one pressure vessel on the first side of the recess to at least one pressure vessel on the second side of the recess to one another rigidly.

5. The motor vehicle according to claim 1, wherein the connectors run below and/or outside the recess and/or laterally next to the recess.

6. The motor vehicle according to claim 1, wherein the longitudinal axis of the recess runs transversely with respect to a motor vehicle longitudinal axis.

7. The motor vehicle according to claim 1, wherein the longitudinal axis of the recess runs longitudinally with respect to a motor vehicle longitudinal axis.

8. The motor vehicle according to claim 1, wherein the connectors run along the motor vehicle longitudinal axis or transversely with respect to the motor vehicle longitudinal axis.

9. The motor vehicle according to claim 1, wherein the first connector and/or the second connector connect longitudinal ends of the pressure vessels.

10. The motor vehicle according to claim 1, wherein the first connector is arranged to the left of the pressure vessels and the second connector is arranged to the right of the pressure vessels, in relation to a forward traveling direction of the motor vehicle.

11. The motor vehicle according to claim 1, wherein the pressure vessels are displaceable along the rails before the configuration of a rigid connection.

12. The motor vehicle according to claim 1, wherein the connectors cover center points of end sides of the pressure vessels.

13. The motor vehicle according to claim 1, further comprising:
    a front seating row and a rear seating row arranged in the passenger compartment, wherein
    the recess is situated between the front seating row and the rear seating row.

14. The motor vehicle according to claim 1, wherein the pressure vessels configure a tubular storage system.

* * * * *